United States Patent
Tajima et al.

(10) Patent No.: US 7,637,056 B2
(45) Date of Patent: Dec. 29, 2009

(54) PLANTING DEVICE AND PLANTING STRUCTURE FOR PLANTS

(75) Inventors: Kunio Tajima, Tokyo (JP); Yoshiaki Gotou, Tokyo (JP)

(73) Assignee: Tajima Ryokka Incorporated, Tokyo (JP)

( * ) Notice: Subject to any disclaimer, the term of this patent is extended or adjusted under 35 U.S.C. 154(b) by 322 days.

(21) Appl. No.: 11/656,305

(22) Filed: Jan. 19, 2007

(65) Prior Publication Data

US 2008/0034654 A1    Feb. 14, 2008

(30) Foreign Application Priority Data

Aug. 14, 2006   (JP) .............................. 2006-220871

(51) Int. Cl.
*A01G 9/02* (2006.01)
*A01G 25/00* (2006.01)

(52) U.S. Cl. .......................................... 47/65.9; 47/86

(58) Field of Classification Search .................. 47/65.9, 47/66, 66.1, 65.5, 1.01, 66.2, 65.6, 33, 86, 47/1.44, 82, 52, 66.6, 87, 85
See application file for complete search history.

(56) References Cited

U.S. PATENT DOCUMENTS

| | | | | |
|---|---|---|---|---|
| 4,118,892 | A * | 10/1978 | Nakamura et al. | 47/65.9 |
| 5,337,517 | A * | 8/1994 | Karthauser et al. | 47/71 |
| 5,437,698 | A * | 8/1995 | Furukawa | 47/65.9 |
| 5,467,555 | A * | 11/1995 | Ripley et al. | 47/65.9 |
| 6,237,285 | B1 * | 5/2001 | Yoshida et al. | 47/65.9 |
| 6,253,487 | B1 * | 7/2001 | Yoshida et al. | 47/33 |
| 6,536,361 | B1 * | 3/2003 | Wu | 111/114 |
| 6,606,823 | B1 * | 8/2003 | McDonough et al. | 47/65.9 |
| 7,392,616 | B1 * | 7/2008 | Bagby | 47/65.9 |
| 2002/0007592 | A1 * | 1/2002 | Mischo | 47/65.9 |
| 2007/0079553 | A1 * | 4/2007 | Genma et al. | 47/85 |
| 2008/0120903 | A1 * | 5/2008 | Fair et al. | 47/65.7 |
| 2008/0236041 | A1 * | 10/2008 | Carpenter | 47/65.9 |
| 2009/0158652 | A1 * | 6/2009 | Yoshida et al. | 47/65.9 |

FOREIGN PATENT DOCUMENTS

| | | |
|---|---|---|
| JP | 2531542 | 9/1996 |
| JP | 2717632 | 2/1998 |
| JP | 3280912 | 5/2002 |
| JP | 3286753 | 5/2002 |
| JP | 3328583 | 9/2002 |

* cited by examiner

*Primary Examiner*—Son T Nguyen
*Assistant Examiner*—Shadi Baniani
(74) *Attorney, Agent, or Firm*—Lipsitz & McAllister, LLC (57) ABSTRACT

The present invention provides a planting device for plants to be formed mainly on a rooftop, a roof of a building, or the like. The planting device for plants comprises a body portion provided with a first fixing means and a second fixing means. The first fixing means is firmly fixed to a mounting surface of the body portion. The second fixing means is linked to the first fixing means. The body portion is provided at a bottom with a water draining means, a water retaining means and the first fixing means. A water receiving means is provided at a side wall of the body portion. Soil is filled into a surrounding space enclosed with the side walls and desired plants (or a desired plant) are planted on the soil. A planting structure in which multiple adjacently arranged planting devices may be used is also provided.

9 Claims, 6 Drawing Sheets

PLANTING DEVICE AND PLANTING STRUCTURE FOR PLANTS

The present application claims the benefit of Japanese patent application no. 2006-220871 filed on Aug. 14, 2006, which is incorporated herein by reference in its entirety for all purposes.

BACKGROUND OF THE INVENTION

1. Field of the Invention

The present invention relates to a planting device for plants and a planting structure in which the device is used.

The present invention relates to a device for cultivating garden trees, flowering plants and other plants easily. In particular, the present invention relates to a planting device for growing plants that is mounted on a rooftop or a roof of a building and also to a water supplying and draining board for loading soil in such a planting device.

2. Description of the Related Art

In recent years, a growing number of attempts have been made for planting plants on rooftops of buildings and in other spaces on a large scale to green inorganic spaces in an urban area.

For this purpose, in most cases, a holddown concrete layer is formed on a waterproof layer on a slab surface of a building and the like, on which a gravel layer composed of sand, gravel and the like as well as a soil dressing layer are alternately laminated as a planting layer for planting plants.

However, in order to provide sufficient water retainability and water drainability for cultivating plants, a relatively large quantity of sediment must be introduced in a waterproof layer, and the concrete layer is also considerably heavy. The combined weight of these two layers affects a building, which is a problem.

The present inventor has disclosed a lightweight planting device which is excellent in water retainability and water drainability (for example, Japanese Published Unexamined Patent Application No. 2531542).

According to the above-described planting device, a waterproof layer is fixed on a slab surface formed on a rooftop of a building or the like, a water retaining member having a nonwoven fabric and the like, and a water retaining/supply/draining means composed of a drain panel having recessed parts and projected parts and the like are provided on the upper surface of the waterproof layer, a planting layer composed of a gravel layer and a soil dressing layer is laminated above the water retaining/supply/draining means, and a proper water retainability and drainability is attained by the water retaining/supply/draining means.

Therefore, this device has eliminated the necessity for a concrete layer which is provided for draining, thereby making it possible to establish a planting layer with a necessary minimum thickness, for example, 50 mm, with consideration given to the length of the root hairs of plants, owing to the improvement in water retainability.

The followings are prior art literature related to the present invention.

[Patent Document 1] Japanese Published Unexamined Patent Application No 2531542

[Patent Document 2] Japanese Published Unexamined Patent Application No 2717632

Accordingly, the above-described conventional planting device achieves the advantage that the weight of the entire device is reduced to avoid an adverse effect on a building. However, such a prior art device still has several problems which need to be improved.

Namely, the conventional device is complicated in structure and includes a large number of components, thereby raising costs of the device or structure and resulting in poor installation efficiency.

Further, this type of conventional device needs various kinds of maintenance work and such work is extremely difficult due to the absence of a scaffold. For example, watering must be done over the surface of the soil of each of the devices and a uniform spraying of water all over the entire soil surface of the device is difficult particularly due to the absence of a scaffold, thereby complicating the work resulting in a longer time to complete the watering.

Also, in such a conventional device, where a construction surface on which greening is carried out is a gradient, the device cannot be formed continuously in a satisfactory manner, causing problems in watering in particular. To be more specific, at such an installation having a gradient, watering must be done at each device, which is much more complicated and difficult due to the gradient as compared to an installation at a flat location.

Technology which can solve this drawback has been disclosed in Japanese Published Unexamined Patent Application No. 2717632. However, in this technology, fixing the device to the rooftop is complicated, resulting in an increase in the installation costs and the time needed in the installation, which is a problem.

The present inventor and the like have been actively engaged in the research and development of a newer planting device and have registered Japanese Patent No. 3280912, Japanese Patent No. 3286753 and Japanese Patent No. 3328583 with regard to such a planting device. However, in the above-described planting devices, a drain plate (water retaining/supply/draining means) and a truncated cone-shaped hollow body used as the fixing means are formed integrally and made complicated in shape and larger in size as a whole. Therefore, where resin is used to form a drain panel, it is not easy to manufacture a mold, thereby increasing costs. Further, it is complicated and requires some work to store and transport such products.

For solving the above problems, a drain panel and a hollow body are constituted with a separate member. Such an attempt has been made that at first, the hollow body is formed and fixed, the drain panel is then formed through the hollow body at an opening part of the drain panel. There is, however, a difficulty in aligning the one member with the other, resulting in poor work efficiency, which is a problem.

Further, since the above-described conventional hollow body is uniform in height, it is necessary to change the thickness of the soil bed, depending on the installation state of the planting devices. Such necessity is not always met and this poses another problem.

SUMMARY OF THE INVENTION

The aim of the present invention is to solve the above problems by providing a planting device for plants to be formed mainly on a rooftop or a roof of a building or the like, namely, a planting device for plants comprising a body portion provided with a first fixing means and a second fixing means. The first fixing means is firmly fixed on a mounting surface of the body portion. The second fixing means is linked to the first fixing means and adapted to be secured to a rooftop of a building or other base. The body portion has a water draining means, a water retaining means and the first fixing means arranged at a bottom of the body portion, and also has a water receiving means arranged at a side wall of the body portion. Soil is filled into a surrounding space enclosed with the side walls to plant desired plants (or a desired plant) thereon.

Further, the above-described planting device may be constituted in such a way that the first fixing means extends up from the bottom of the body portion and is provided at the top with a scaffold for maintenance work.

Further, in any planting device for plants described above, ribs may be provided on the bottom of the body portion for preventing the movement of soil and reinforcing the body portion used as a cabinet.

Still further, in any planting device for plants described above, a plurality of recessed parts may be formed at a water draining means, a drain hole may be formed on the bottom of the recessed part and between the recessed parts, and the water retaining means may comprise a water retaining recessed part formed around the first fixing means which extends up from the bottom of the body portion and a water collecting part adjacent to the water retaining recessed part.

Still further, in any planting device for plants described above, the water receiving means, which may be mounted outside a side wall of the body portion, may be provided with a water supply pipe holder and a water receiving hole formed on the side wall for flowing water from the water supply pipe to the water retaining means.

Further, in any planting device for plants described above, a partition plate may be provided on the bottom of the body portion for preventing the movement of soil.

Still further, any planting device for plants described above may be constituted in such a way that the first fixing means mounted at the body portion is formed with a hollow conical body extending up from the bottom of the body portion. A conical body used as the second fixing means is fitted into the hollow conical body of the first fixing means, where the second fixing means is adapted to be fixed to a building or other bases so as to fix the body portion.

Further, in any planting device for plants described above, a recessed part, in which the water supply pipe holder of an adjacently arranged body portion may be fitted, may be provided outside a side wall opposite to the side wall having the water supply pipe holder of the body portion, so as to stably provide the continuous arrangement of multiple body portions adjacent to each other.

In the above-described planting device for plants, a through hole leading water from the water retaining means may be provided above the recessed part in which the water supply pipe holder is fitted to enable the water from the water retaining means at the body portion arranged at an upper side of a gradient to flow down to the pipe holder at an adjacently arranged body portion at a lower side of the gradient when two or more body portions are formed continuously at a surface having a gradient, and to flow the water to the water retaining means at the body portion arranged at the lower side of the gradient.

In any planting device for plants described above, the ribs for reinforcement may be provided at an outer periphery of the first fixing means having the scaffold for maintenance work.

The present invention is to solve the above problems of the prior art by also providing a planting structure for plants to be formed mainly on a rooftop or a roof of a building or the like, the planting structure for plants comprising a body portion provided with the first fixing means firmly fixed to the mounting surface of the body portion and a second fixing means linked to the first fixing means, and the water supply pipe for the body portion. The body portion has a water draining means, a water retaining means and the first fixing means arranged at a bottom of the body portion, and is provided with a water receiving means from the water supply pipe at the side wall. Soil is filled into a surrounding space enclosed with the side walls to plant desired plants (or a desired plant) thereon.

Further, a planting structure for plants described above may be constituted in such a way that the first fixing means extends up from the bottom of the body portion and its top is provided with a scaffold for maintenance work, a plurality of recessed parts are formed at a water draining part, a drain hole is formed on the bottom of the recessed part and between the recessed parts, and the water retaining means is provided with a water retaining recessed part formed around the first fixing means which extends up from the bottom of the body portion and a water collecting part adjacent to the water retaining recessed part, the water receiving means being mounted outside the side wall and is provided with a water supply pipe holder and the water receiving hole formed on the side wall for flowing water supplied from the water supply pipe to the water retaining means, the first fixing means is formed with a hollow conical body extending up from the bottom. A conical body used as the second fixing means is fitted into the hollow body of the first fixing means and fixed to a building or other bases so as to fix the body portion.

Further, in a planting device for plants described above, a recessed part, in which the water supply pipe holder of an adjacently arranged body portion is fitted, is provided outside the side wall opposite to the side wall having the water supply pipe holder of the body portion so as to stably provide the continuous arrangement of multiple body portions adjacent to each other.

Still further, in a planting device for plants described above, a through hole leading water from the water retaining means is formed above the recessed part in which the water supply pipe holder is fitted to enable the water from the water retaining part at the upper side of the body portion to flow down to the pipe holder at the lower side of an adjacently arranged body portion when body portions are formed continuously at a surface having a gradient, and to flow the water to the water retaining part of the body portion arranged at the lower side of the gradient.

The following effects can be obtained by the above constitution of the present invention.

(a) Due to being simple in structure, small in number of components and light in weight, the device or the structure of the present invention can be available at a low cost and an increase in the construction efficiency.

(b) Due to the fact that a scaffold is provided, various types of maintenance work can be done easily. For example, watering the plants over the surface of the soil at each of the devices is not necessary but a uniform watering can be easily done over the soil of all the devices arrayed continuously. Such watering can be done simply by allowing water to pass through a water supply pipe, thereby saving the time.

(c) Where a construction surface on which greening is carried out is a gradient, the devices can be easily formed continuously to attain a high efficiency, particularly in terms of watering. In other words, in a conventional technology, spraying water must be done at each of the devices at a location having a gradient. However, in the present invention, if watering is done with the device beginning at upward step side of a gradient, the surplus water continuously flows down to the device at the downward step side of the gradient, thereby providing a proper watering all over the area of the planting device.

BRIEF DESCRIPTION OF THE DRAWINGS

FIG. 6 is a partially notched cross sectional view illustrating a connection state of the first fixing means (truncated cone-shaped hollow body 7) mounted on the body portion (cabinet 1) with the second fixing means firmly fixed to a rooftop base of a building structure or the like.

DETAILED DESCRIPTION OF THE INVENTION

According to the present invention, a planting device is provided with a body portion having a first fixing means and a second fixing means. The first fixing means is firmly fixed to a mounting surface of the body portion. The second fixing means is linked to the first fixing means. The body portion is provided at a bottom with a water draining means, a water retaining means and the first fixing means. The body portion is also provided at a side wall with a water receiving means. Soil is filled into a surrounding space enclosed with the side walls. A water supply pipe is erected at the water receiving means, thereby supplying water to the water retaining means formed at the bottom of the body portion. Soil is filled into the body portion to plant desired plants (or a desired plant) and to cultivate the plants thereon.

The body portion comprises a rectangular plastic cabinet, and a recessed part for reinforcement of the strength of the body portion is formed at a bottom of the body portion so that the thickness of the plastic is reduced, enabling the cabinet to be of a light-weight construction. Further, a water supply pipe is hooked on at the outside of one of the four side walls forming the cabinet, and a water receiving hole is also formed as a water receiving means into which water from the water supply pipe flows. Also, the ribs projecting outward are formed for reinforcing the strength of the cabinet at the upper end of the other three side walls.

The first fixing means extends up from the bottom of the cabinet, around which a water retaining recessed part is formed to allow water to stay in, and a water collecting part having gradient paths is formed in contact with the water retaining recessed part. A water retaining means is constituted with the water retaining recessed part and the water collecting part, and a water draining means is provided on both sides of the water retaining part. The partition ribs for preventing the movement of soil and for reinforcement are formed between the water retaining means and the water draining means, and such partition ribs are also formed on the water draining means.

The first fixing means extends up from the bottom of the cabinet, which cabinet is used as a body portion, and the first fixing means is formed with an approximately truncated cone-shaped hollow body and fitted onto another truncated cone-shaped hollow body firmly fixed to a base and used as the second fixing means The cabinet is fixed to the base by the cooperation of the first and second fixing means. A scaffold for maintenance work is provided at the top of the truncated cone-shaped hollow body used as the first fixing means, and ribs for reinforcing the scaffold are formed at an outer periphery of the truncated conical body. Also, as described above, a plurality of recessed parts are formed at the water draining means, and a drain hole is formed on the bottom surface of the recessed part and also between each of the recessed parts.

Further, in any one of planting devices for plants so far described above, a recessed part, in which the water supply pipe holder of an adjacently arranged body portion may be fitted, is provided at the outside of a side wall opposite to the side wall having the water supply pipe holder of the body portion, so as to stably provide the continuous arrangement of the body portions adjacent to each other.

In the above-described planting devices for plants, where one or more planting devices are formed on a surface having a gradient, surplus water flowing from a device at the upward step side of the gradient will move smoothly to an adjacently arranged device at the downward step side of the gradient. To be more specific, the water retaining recessed part of the body portion arranged at the upper side of the gradient is fitted into the water supply pipe holder of an adjacently arranged body portion arranged at a lower side of the gradient, and a through hole leading water from the water collecting part is formed so that the water can flow down from the water retaining means of the body portion at the upper side of the gradient to the pipe holder of the adjacently arranged body portion at the lower side of the gradient, and the water can flow into the water retaining recessed part of the water retaining means of the body portion at the lower side of the gradient.

Figure 1:
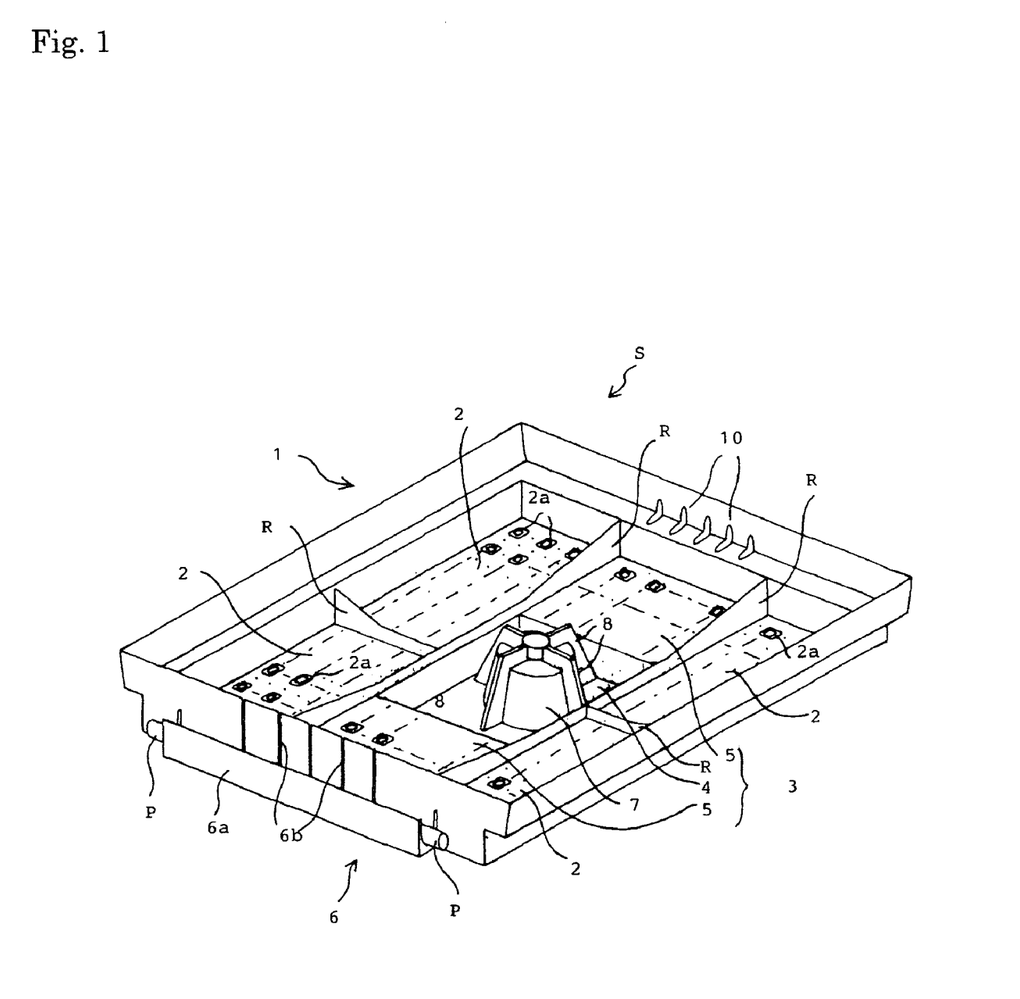
FIG. 1 is a perspective view illustrating one embodiment of the present invention.
Figure 2:
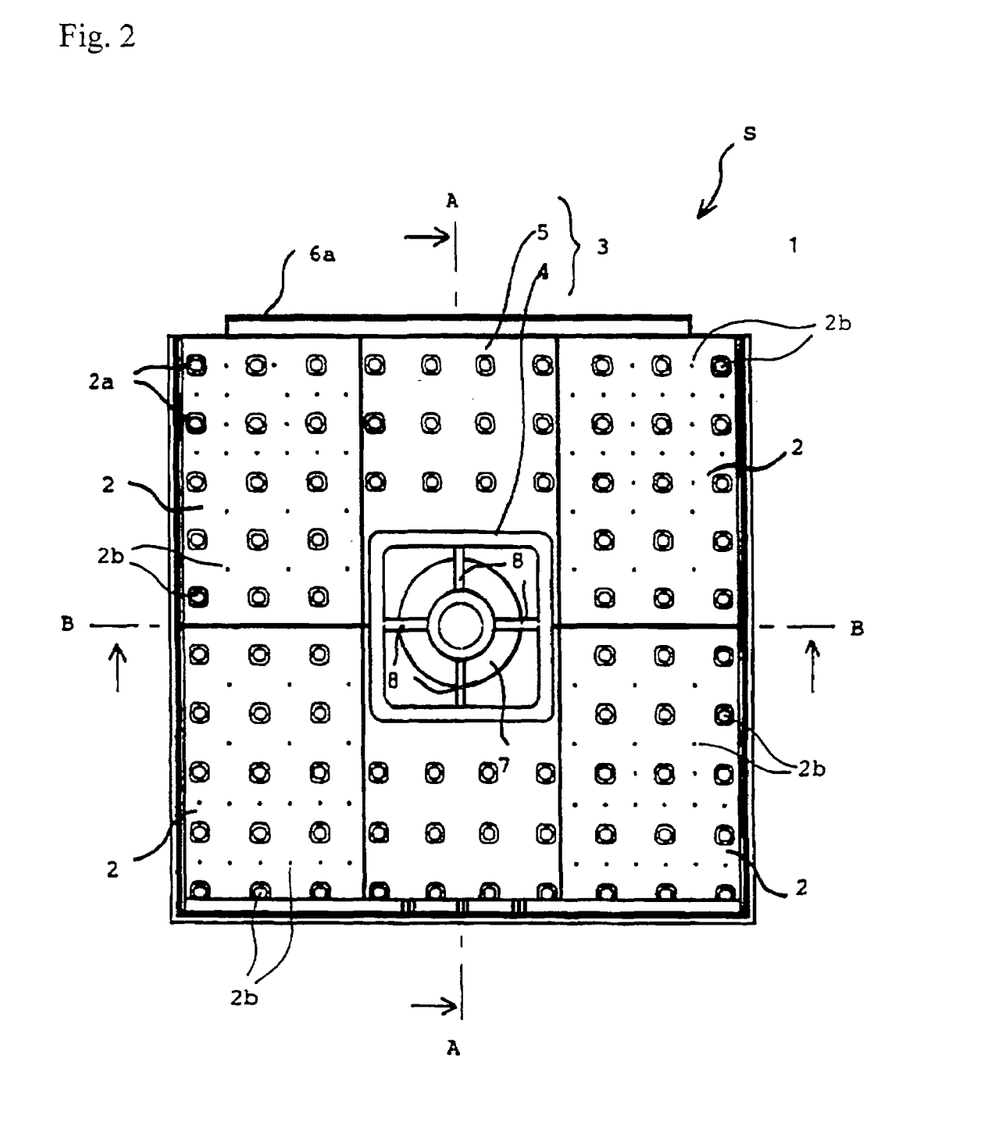
FIG. 2 is a plan view of the planting device illustrated in FIG. 1.
Figure 3:
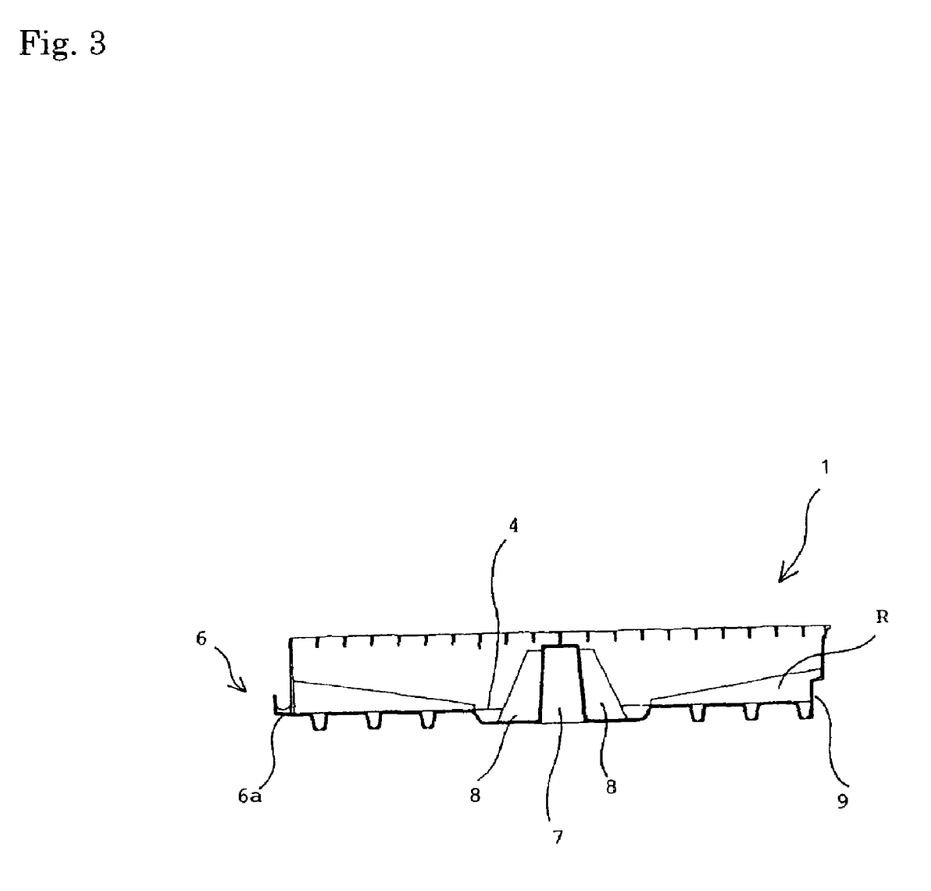
FIG. 3 is a cross sectional view taken along line A-A in FIG. 2.
Figure 4:
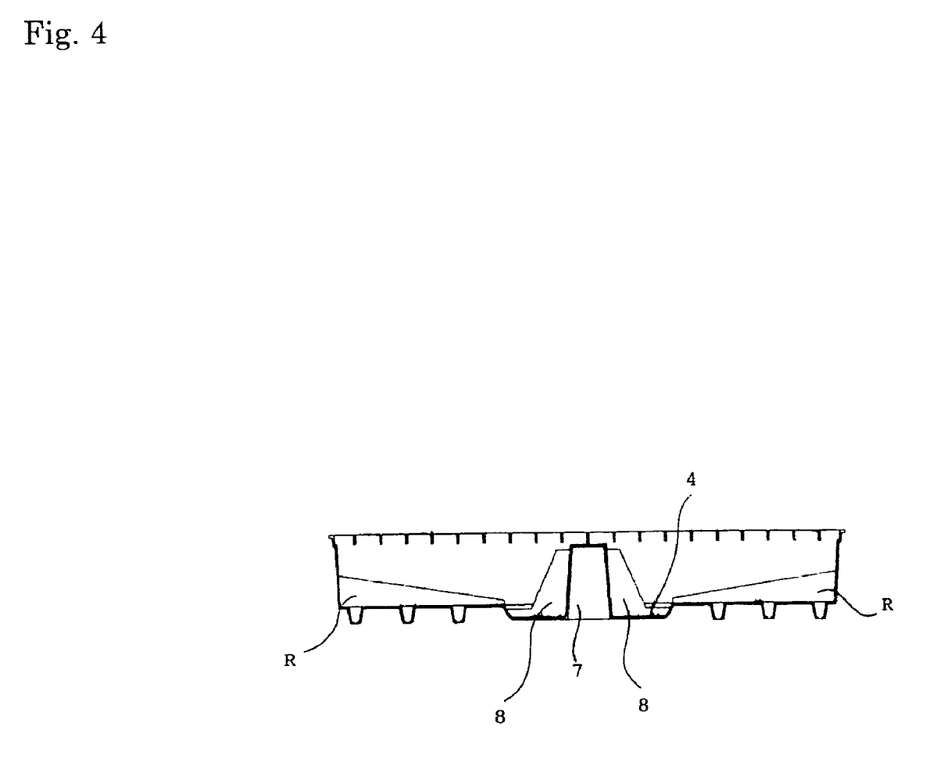
FIG. 4 is a cross sectional view taken along line B-B in FIG. 2.

Hereinafter, an explanation will be made for embodiments of the present invention by referring to drawings. FIG. 1 and FIG. 2 are respectively a perspective view and a plan view illustrating one embodiment of a planting device related to the present invention. Further, FIG. 3 and FIG. 4 are respectively a cross sectional view taken along line A-A and a cross sectional view taken along line B-B of FIG. 2.

In these drawings, S denotes a planting device for plants to be formed on a rooftop or a roof of a building or the like. This planting device S (provided with a first fixing means) has a rectangular cabinet 1 opened on the upper surface and having four side walls as a plastic-made body portion. This cabinet 1 is provided with a water draining means 2 and a water retaining means 3 at the bottom. One side wall is provided with a water receiving means 6, soil is filled into a surrounding space enclosed with the side walls to plant desired plants (or a desired plant) thereon.

The water retaining means 3 is comprised of a water retaining recessed part 4 and a pair of water collecting parts 5, 5 adjacent thereto. A truncated cone-shaped hollow body 7 extends up from the bottom of the cabinet 1 and is used as a first fixing means at the center of the water retaining recessed part 4, and a scaffold for maintenance work (to be described later) is fixed at the top of the first fixing means. The numbers 8, 8 . . . denote ribs for reinforcing the scaffold.

Partition ribs, R, R . . . , are provided at the bottom of the cabinet 1 used as a body portion for preventing the movement of soil and reinforcing the cabinet 1.

A plurality of recessed parts 2a are formed at the water draining means 2, and a drain hole 2b is provided at the bottom of each of the recessed part 2a and between the individual recessed parts 2a. Furthermore, the water receiving means 6 formed outside a side wall is provided with a slit 6b used as a water receiving hole formed on the side wall for flowing water supplied from a water supply pipe holder 6a and a water supply pipe P to the water retaining means 3.

As described above, the first fixing means is formed with a truncated cone-shaped hollow body 7 extending up from the bottom of the cabinet 1 and fitted onto another truncated cone-shaped hollow body (described below) which is fixed to a building or other bases and which is used as a second fixing means, thereby fixing the body portion (cabinet 1).

Also, as illustrated in FIG. 3, a recessed part 9, in which the water supply pipe holder 6*a* of an adjacently arranged cabinet 1 may be fitted, is provided outside a side wall opposite to the side wall having the water supply pipe holder 6*a* of the body portion (cabinet 1), so as to stably provide the continuous arrangement of the body portions (cabinet 1) adjacent to each other.

Figure 5:
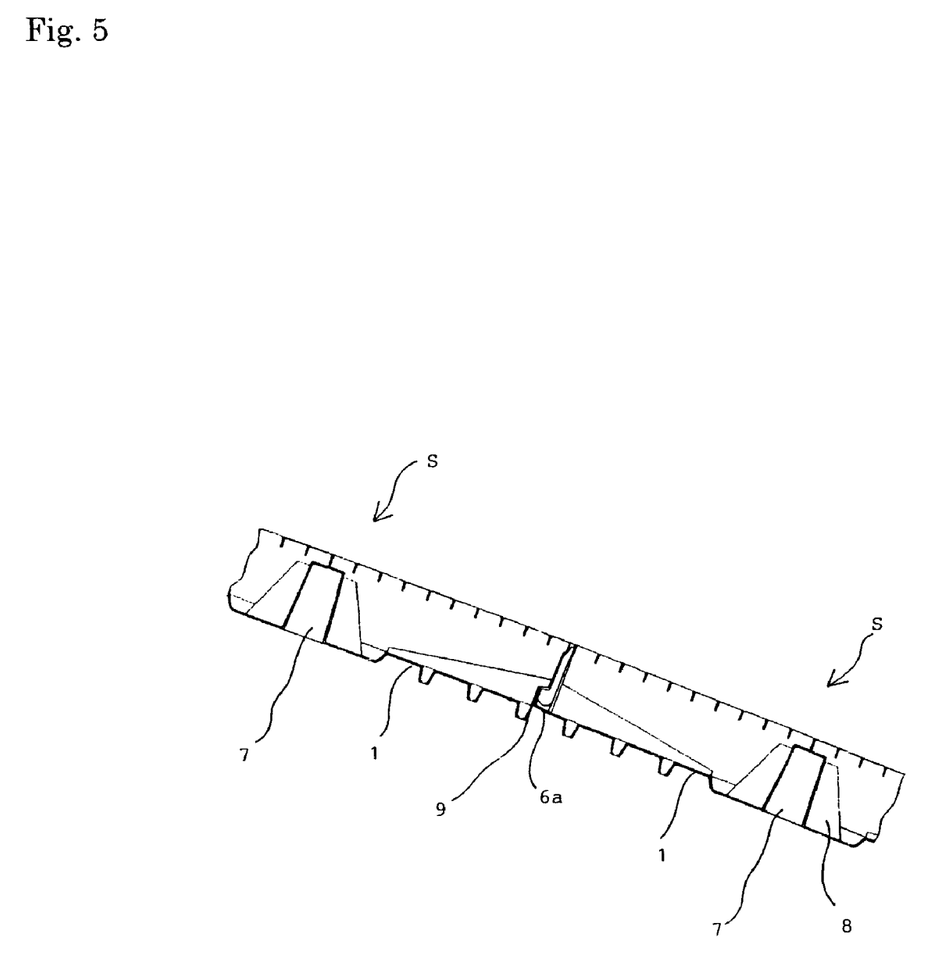
FIG. 5 is a partially notched cross sectional view illustrating an embodiment in which the planting device S is formed on a gradient part.

FIG. 5 is a partially notched cross sectional view illustrating an embodiment in which two planting devices S are adjacently arranged on a surface having a gradient. As illustrated in FIG. 1, through slits 10, 10 leading water from the water retaining means 3 are formed at the recessed part 9 of a first planting device S at an upper side of the gradient in which the water supply pipe holder 6*a* of an adjacently arranged second planting device S at the lower side of the gradient is fitted, and water flows down from the water retaining means 3 of the body portion (Cabinet 1) at the upper side of gradient to a pipe holder 6*a* of the of the adjacently arranged body portion (cabinet 1) at the lower side of the gradient, when the two body portions are continuously arranged next to each other on a surface having a gradient, and the water flows to the water retaining means 3 of the body portion (1) at the lower side of the gradient, thereby surplus water from watering is effectively transferred to the adjacently arranged cabinet 1.

As illustrated in FIG. 2, the ribs for reinforcement are formed projecting outward on three side walls excluding the side wall having the water supply pipe holder 6*a* at the upper end of the side walls of the cabinet 1.

Figure 6:
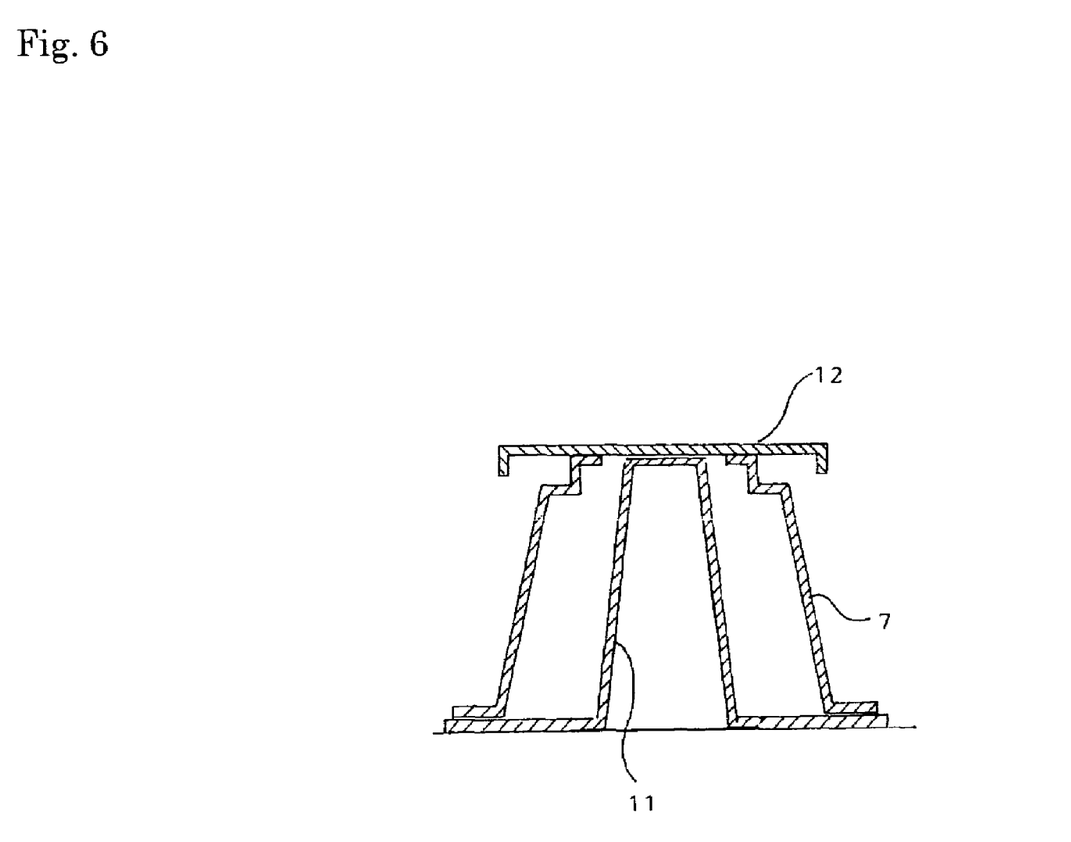

FIG. 6 is a partially notched cross sectional view illustrating a link state of a first fixing means (truncated cone-shaped hollow body 7) mounted at the body portion (cabinet 1) with a second fixing means firmly fixed to a rooftop base of a building or the like. The second fixing means is constituted with a truncated cone-shaped hollow body 11, and the first fixing means of the cabinet 1 (truncated cone-shaped hollow body 7) is fitted onto the second fixing means (truncated cone-shaped hollow body 11) firmly fixed to the base, to fix the planting device S. Securing the panting device to the rooftop or other surface requires only to fit the first and second fixing means together, as described above, and this can be done quite simply and effectively. A circular opening is formed at the top of the first fixing means (truncated cone-shaped hollow body 7). The opening is larger in diameter than the top of the second fixing means (truncated cone-shaped hollow body 11), by which they are fitted loosely and the fitting work can be done smoothly. Then, a scaffold plate 12 for maintenance work is fixed at the top of the first fixing means (truncated cone-shaped hollow body 7) by using screws, an adhesive or any other appropriate means. Further, as descried above, reinforcement ribs, 8, 8 . . . for supporting and reinforcing the scaffold plate 12 for maintenance work are provided at an outer periphery of the first fixing means (truncated cone-shaped hollow body 7).

In the planting device S, water flow from a water supply pipe P reaches to a water retaining means 3, in particular, then stays and is stored at a water retaining recessed part 4. The surplus water overflows beyond the partition ribs R and permeates into soil placed on the cabinet 1 to grow plants. Further, the surplus water, which is not retained by the soil, runs down to the water retaining means or the water draining means where it is retained or drained.

The planting devices S related to the previously-described embodiments may be formed continuously, for example, on a rooftop base or a gradient roof, lightweight artificial soil or the like is placed therein, plants are planted, a water supply pipe is formed and linked to a water supply source, thereby constituting a planting structure. As described above, such a planting structure is provided with a scaffold for maintenance work, thus making it possible to easily conduct various types of work necessary for planting plants or maintaining the planting devices.

DESCRIPTION OF SYMBOLS

1: body portion (cabinet)
2: water draining means
2*a*: recessed part
2*b*: drain hole
3: water retaining means
4: water retaining recessed part
5: water collecting part
6: water receiving means
6*a*: water supply pipe holder
6*b*: (water receiving) slit
7: first fixing means
8: reinforcement rib
9: recessed part
10: water passing through slit
11: second fixing means
12: scaffold plate for maintenance work
P: water supply pipe
R: partition rib
S: Planting Device

What is claimed is:

1. A planting device for plants to be formed on a rooftop of a building, comprising:
   a body portion having a mounting surface,
   a water draining means and a water retaining means at a bottom of the body portion,
   a plurality of recessed parts formed at the water draining means, drain holes being formed on a bottom of each of the recessed parts and between the plurality of recessed parts;
   a water receiving means at a side wall of the body portion, the water receiving means being mounted outside the side wall and provided with a water supply pipe holder and a water receiving hole formed on the side wall for flowing water supplied from a water supply pipe to the water retaining means;
   a first fixing means having a hollow conical body which is fixed to the mounting surface of the body portion and extending up from the bottom of the body portion,
   a second fixing means having a conical body adapted to be fitted into the hollow conical body of the first fixing means, the second fixing means being adapted to be fixed to a rooftop of a building or a base,
   a scaffold for maintenance work is provided on a top of the first fixing means;
   a recessed part provided outside a side wall opposite to the side wall having the water supply pipe holder of the body portion, in which recessed part the water supply pipe holder of an adjacently arranged body portion is fitted, so as to stably provide a continuous arrangement of the body portion and the adjacently arranged body portion; and
   one or more through holes formed above the recessed part for leading water from the water retaining means of the body portion into the pipe holder of the adjacently arranged body portion which is fitted into the recessed part of the body portion, when the first body portion is positioned at an upper side of a gradient surface and the adjacently arranged body portion is positioned on a lower side of the gradient surface, so as to flow the water to the water retaining means of the adjacently arranged body portion;

wherein the soil is filled into a surrounding space enclosed with the side wall to plant one or more desired plants thereon.

2. The planting device for plants of claim 1, further comprising partition ribs on the bottom of the body portion for preventing movement of soil and reinforcing the body portion.

3. The planting device for plants of claim 1, wherein the water retaining means is provided with a water retaining recessed part formed around the first fixing means and with a water collecting part adjacent to the water retaining recessed part.

4. The planting device for plants of claim 1, wherein ribs for reinforcement are provided at an outer periphery of the first fixing means having the scaffold for maintenance work.

5. The planting device for plants of claim 1, wherein the water receiving hole comprises a plurality of slits.

6. The planting device for plants of claim 1, wherein the one or more through holes comprise a plurality of slits formed above the recessed part.

7. The planting device for plants of claim 1, wherein a plurality of body portions are adjacently arranged on the gradient surface.

8. The planting device of claim 7, wherein watering plants arranged in the plurality of adjacently arranged body portions is accomplished by providing water to the body portion arranged at the upper side of the gradient.

9. The planting device of claim 1, wherein the body portion is mounted to the rooftop or base by first securing the second fixing means to the rooftop or base and then fitting the hollow body of the first fixing means over the second fixing means.

* * * * *